US005495757A

United States Patent [19]

Atanasyan et al.

[11] Patent Number: 5,495,757

[45] Date of Patent: Mar. 5, 1996

[54] METHOD AND DEVICE FOR DETECTION OF IGNITION FAILURES IN AN INTERNAL COMBUSTION ENGINE CYLINDER

[75] Inventors: Alain A. Atanasyan, Tournefeuille; Serge C. Guipaud, Ramonville St Agne, both of France

[73] Assignee: Siemens Automotive S.A., Toulouse Cedex, France

[21] Appl. No.: 142,326

[22] PCT Filed: Mar. 5, 1992

[86] PCT No.: PCT/EP92/00977

§ 371 Date: May 5, 1995

§ 102(e) Date: May 5, 1995

[87] PCT Pub. No.: WO92/20912

PCT Pub. Date: Nov. 26, 1992

[30] Foreign Application Priority Data

May 15, 1991 [FR] France .................................. 91 05868

[51] Int. Cl.[6] ............................ G01M 15/00; F02P 5/04; F02P 5/15; F02P 17/04

[52] U.S. Cl. .......................... 73/35.06; 73/116; 73/35.08; 324/380

[58] Field of Search .................................... 73/116, 35 R, 73/118.1, 35 I; 324/380, 382, 388

[56] References Cited

U.S. PATENT DOCUMENTS

| | | | |
|---|---|---|---|
| 2,517,976 | 8/1950 | Clarke | 73/35 I |
| 3,035,224 | 5/1962 | Whaley et al. | 73/35 I |
| 4,003,248 | 1/1977 | Leichle | 73/116 |
| 4,262,524 | 4/1981 | Russo et al. | 73/116 |
| 4,359,893 | 11/1982 | Kizler et al. | 73/35 I |
| 4,601,193 | 7/1986 | Blauhut et al. | 73/35 I |
| 4,648,367 | 3/1987 | Gillbrand et al. | 73/35 I |
| 4,762,106 | 8/1988 | Blauhut | 73/35 I |
| 4,862,093 | 8/1989 | Jiewertz | 324/380 |
| 4,987,771 | 1/1991 | Iwata | 73/116 |
| 5,067,462 | 11/1991 | Iwata et al. | 123/414 |
| 5,087,882 | 2/1992 | Iwata | 324/388 |
| 5,146,893 | 9/1992 | Ohsawa | 123/425 |
| 5,207,200 | 5/1993 | Iwata | 73/35 |
| 5,230,240 | 7/1993 | Ohsawa et al. | 73/116 |
| 5,271,268 | 12/1993 | Ikeuchi et al. | 73/35 |

FOREIGN PATENT DOCUMENTS

| | | | |
|---|---|---|---|
| 0141049 | 5/1985 | European Pat. Off. . | |
| 7405778 | 9/1975 | France . | |
| 7631968 | 5/1977 | France . | |
| 9104334 | 10/1992 | France . | |
| 2802196 | 7/1979 | Germany . | |
| 3934310 | 4/1990 | Germany . | |
| 0031941 | 2/1986 | Japan | 73/35 |
| 0057830 | 3/1986 | Japan | 73/35 |
| 89/09333 | 10/1989 | WIPO . | |

*Primary Examiner*—Richard E. Chilcot, Jr.
*Assistant Examiner*—George M. Dombroske
*Attorney, Agent, or Firm*—Herbert L. Lerner; Laurence A. Greenberg

[57] ABSTRACT

A second spark is triggered, after a first ignition spark. The initiation overvoltage of the second spark is detected. The overvoltage and the occurrence or the non-occurrence of a failure of ignition of the air/fuel mixture prior to the second spark is deduced, according to whether the overvoltage is greater or less than a predetermined threshold voltage. Application to the protection of a chamber containing an oxidation, reduction catalyst for the exhaust gases of the engine.

12 Claims, 1 Drawing Sheet

METHOD AND DEVICE FOR DETECTION OF IGNITION FAILURES IN AN INTERNAL COMBUSTION ENGINE CYLINDER

CROSS-REFERENCE TO RELATED APPLICATION

This application is a continuation of international application PCT/EP92/00977, filed May 5, 1992, designating the United States, and published as WO 92/20912.

The present invention relates to a method and to a device for detection of ignition failures in an internal combustion engine. More particularly, the present invention also relates to an application of such a method and of such a device to the prevention of degradation of a "catalytic" oxidation converter for the exhaust gases of the engine.

Ignition failures in an internal combustion engine reveal various disorders which can affect either means dedicated to the ignition of the air/fuel mixture (coil, spark plug, short-circuit of the supply lines, etc.) or means of constituting the said mixture (carburettor, injector). Means of detection of such failures are thus used in order to correct these disorders by cleaning, adjusting or replacement of faulty parts.

Increasingly strict regulations in matters of air pollution lead, in addition, to considering the installation of such means of detection for other purposes. In fact, catalysts used in order to oxidize or reduce the exhaust gases of an engine are themselves liable to be degraded by injections of uncombusted fuel. In particular, when there is ignition failure in a cylinder of the engine, the fuel of the mixture introduced into the cylinder then passes directly on to the catalyst, without prior combustion. Such injections considerably diminish the effectiveness of the catalyst in its conversion of the exhaust gases, hydrocarbons, carbon oxides, nitrogen oxides, etc., into less polluting oxides. It is, therefore, advisable to protect the catalyst from such injections of uncombusted fuel, by, for example, cutting off the supply of fuel to an injector when ignition failures in a cylinder of an engine have been detected.

In order to detect such ignition failures, the use may be considered of a sensor sensitive to the pressure obtained in the cylinder. In the case of ignition failure, such a sensor does not detect the high pressure which normally results from the explosion of the air/fuel mixture. The sensors currently used to measure the pressure in an internal combustion engine cylinder suffer, especially due to the particularly severe environment in which they are installed, from inadequate robustness, reliability and accuracy, being very sensitive to temperature. They are, moreover, too expensive to be installed in an engine for a vehicle with a wide distribution.

The explosion of the air/fuel mixture which normally follows on from the generation of an ignition spark creates conditions of temperature and of pressure in an internal combustion engine cylinder which bring about ionization of the gases contained in the latter. The absence of such ionization thus reveals the prior occurrence of an ignition failure. In French Patent No. 91 04334, filed on the 10th April 1991 by the applicant, there is described a method for detection of an ignition failure, according to which, after extinction of an ignition spark, the presence or the absence of ionization of the gases contained in the cylinder is detected by supplying the spark plug for ignition of the mixture with a predetermined electrical voltage and by then detecting the possible passage of a current in the spark plug. The spark plug then serves as ionization probe, which renders the implementation of this method of detection particularly inexpensive.

For this implementation, there is proposed, in the above-mentioned patent application, a device comprising a distributor modified by the addition of diodes to permit the passage of the "ionization" current in the spark plug. The diodes must be able to withstand a very high inverse voltage during the spark ignition in the spark plugs and are thus fairly expensive. Moreover, in the case of accidental disconnection of a spark plug, the associated diode behaves as a capacitor, which can lead to its destruction under very high voltage.

Thus the aim of the present invention is to provide a method and a device for detection of ignition failures in an internal combustion engine cylinder, which are reliable in operation and as cheap as possible to implement.

This aim of the invention is attained, as well as others which will appear on reading the description which will follow, with a method of detection of ignition failures in an internal combustion engine cylinder into which an air/fuel mixture is introduced and in which a spark is electrically generated in order to ignite the mixture. According to the invention, after the triggering of this spark, a second spark is triggered, the breakdown overvoltage of this second spark is detected, this overvoltage is compared with a predetermined threshold voltage and the occurrence or the non-occurrence of a failure of ignition of the mixture prior to this second spark is deduced, according to whether the overvoltage detected is greater or less than the predetermined threshold voltage.

Advantageously, the first and second sparks are triggered successively with the same ignition spark plug, the second spark being emitted when the air/fuel mixture has undergone ionizing combustion after the triggering of the first spark. It is seen, in fact, that the over-voltage which is measured on the spark plug, during breakdown of the second spark, is, due to the ionizing combustion, clearly less than that which is observed in the absence of prior combustion of the mixture, resulting from an ignition failure.

For the implementation of this method, the invention provides a device comprising a) means for triggering a second spark in an ignition spark plug of a cylinder of the engine following the triggering in this spark plug of a firstspark for ignition of the air/fuel mixture, b) means for detecting the amplitude of the breakdown overvoltage of the second spark, and c) means for comparing this overvoltage with a predetermined threshold. The means of detection comprise a capacitor connected to a supply circuit for the spark plug and means for inhibiting charging of this capacitor outside of a predetermined time interval during which the second spark overvoltage must occur.

Other characteristics and advantages of the method and of the device according to the present invention will appear on reading the description which will follow and on studying the attached drawing in which:

DETAILED DESCRIPTION OF THE PREFERRED EMBODIMENT

Figure 1:
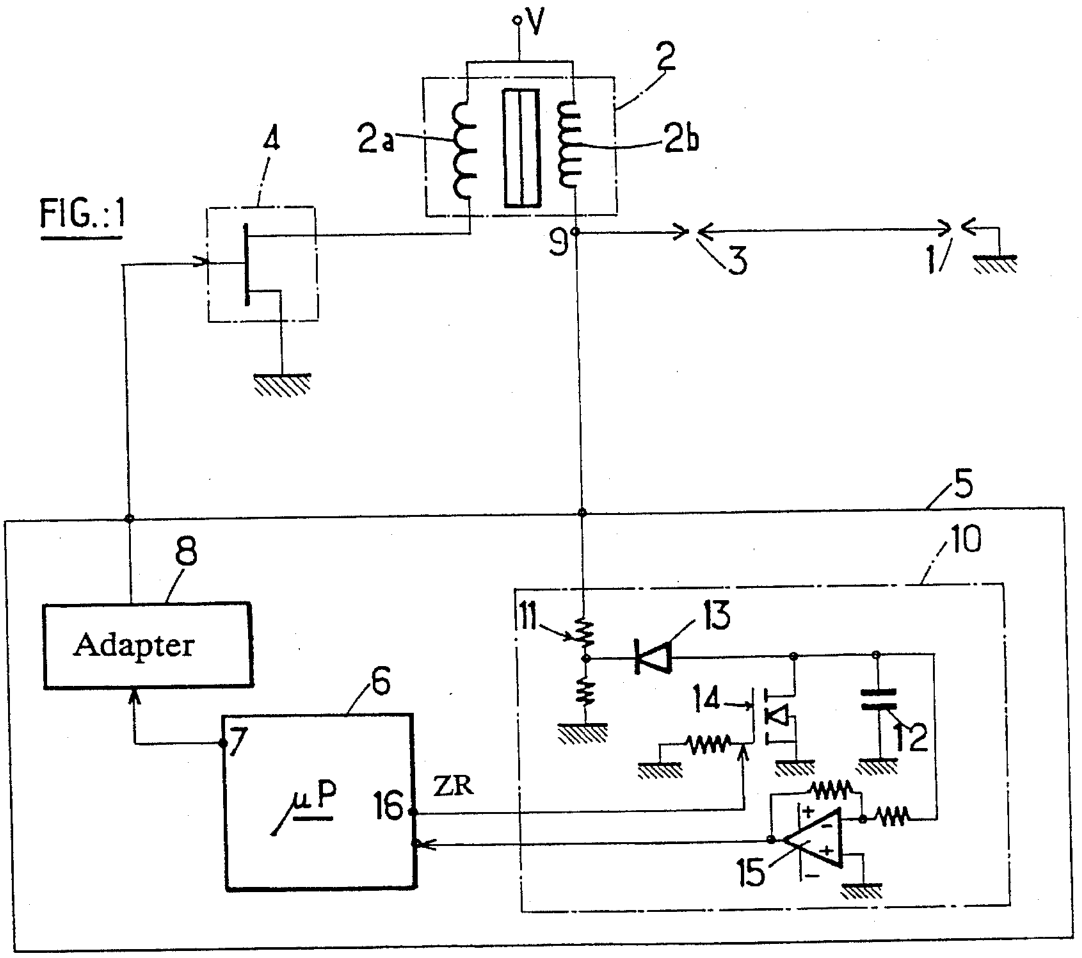
FIG. 1 diagrammatically represents a device for detection of ignition failures according to the invention, incorporated in an internal combustion engine ignition device.

With reference to FIG. 1 of the attached drawing, a conventional ignition device for an internal combustion engine is represented, comprising at least one spark plug 1 mounted in a cylinder of the engine, and an ignition coil 2 comprising primary 2*a* and secondary 2*b* windings. The charging of the coil 2 is controlled by causing a current to pass in the primary 2*a* winding and then by abruptly cutting off this supply in order to bring about a transfer of electrical energy at very high voltage (of the order of 20 to 40 kV) into the secondary winding. This very high voltage transmitted to the electrodes of the spark plug 1 by a distributor 3 brings about the breakdown of a spark between the electrodes of the spark plug and the combustion of an air/fuel mixture previously introduced into the cylinder where this spark plug is found.

In a modern ignition device, the supply to the primary winding by a source of voltage V (a+12 volt battery for example) is controlled by a coil control module 4, this module being itself controlled by a computer 5 comprising a microprocessor 6 duly programmed in order to control the charging of the coil as well as the instant of breakdown of a spark in the spark plug. This instant is defined, as is well known, by an "ignition advance angle", determined with the aid of means of angular indexing of the engine cycle (not represented) and of numerical tables placed in memory and giving the value of this angle as a function of operating parameters of the engine, such as the air inlet pressure and the speed of rotation of the engine, for example. The microprocessor 6 delivers, on an output 7, a control signal for the coil control module 4, after processing this signal in an adaptor stage 8.

Figure 2:
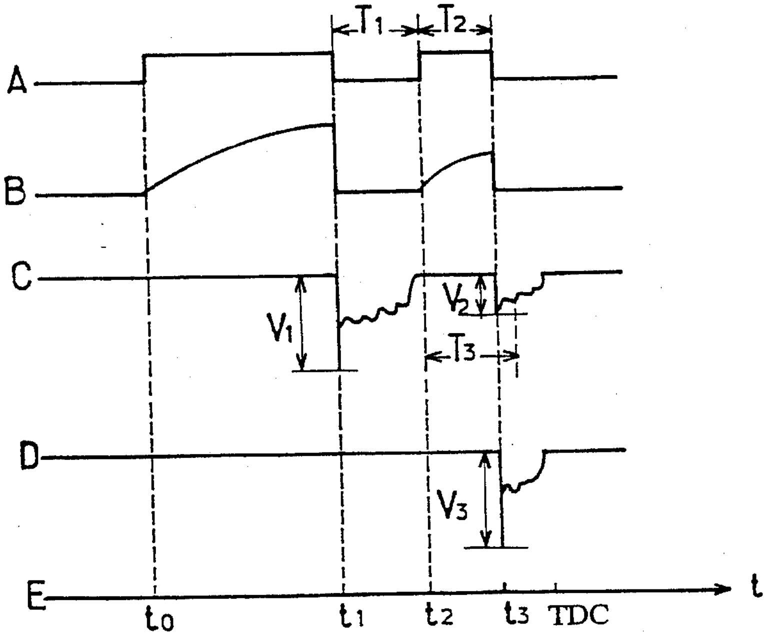
FIG. 2 is a set of timing diagrams used for explanation of the method of detection according to the invention.

Referring now to FIG. 2 of the attached drawing, at A is represented the control signal for the module 4 emitted by the microprocessor 6 on its output 7, at B the current flowing in the primary winding of the coil, at C the voltage which is observed at the point 9 of the secondary circuit of the ignition device, between the secondary winding 2*b* and the distributor 3. Conventionally, the supply to the primary winding 2*a* being triggered at instant $t_0$, the current (FIG. 2, B) in this winding increases up to the instant $t_1$ at which the microprocessor 6 controls cutoff of this supply in order thus to bring about a transfer of energy into the secondary winding 2*b* and the breakdown of a spark in the spark plug 1 in order to fire the air/fuel mixture. As represented in FIG. 2, C, the voltage sampled at 9 is then characterised by a high initial overvoltage $V_1$, for initiation of the spark, which voltage then dies away progressively.

The combustion of the air/fuel mixture triggered by the spark gives rise to strong ionization of the chemical species contained in the cylinder, which ionization lowers the initiation or breakdown voltage of a spark in the spark plug.

According to the invention, advantage is taken of this phenomenon to detect a possible ignition failure at instant $t_1$. In order to do this, after the instant $t_1$ of triggering of the spark for ignition of the air/fuel mixture, a second spark (at an instant $t_3$) is triggered, the initiation overvoltage of this second spark is detected, this overvoltage is compared with a predetermined threshold voltage and the occurrence or the non-occurrence of a failure of ignition of the mixture at instant $t_1$ is deduced according to whether the overvoltage detected is greater or less than the predetermined threshold voltage.

In order to bring about ignition of this second spark, the primary winding 2*a* has to be resupplied during a time interval $T_2$, which is offset from the instant of breakdown $t_1$ of the first spark by a time interval $T_1$. This interval $T_1$ is chosen such that the total energy dissipated by the first spark ensures complete combustion of the air/fuel mixture introduced into the cylinder. Resupply of the primary winding cuts off the first spark, and the recharge time $T_2$ of the coil depends on the energy recuperated in the secondary winding and induced during triggering of the first spark.

A marked difference is seen in the initiation voltages of the second spark, according to whether the first spark has or has not brought about ignition of the air/fuel mixture.

Thus, in an experimental implementation of the present invention, it has been possible to measure at the point 9, during initiation of the second spark, an overvoltage $V_2$=900 V approximately, when there has been prior ignition of the air/fuel mixture and an overvoltage $V_3$=1500 V approximately when there has been ignition failure during the first spark. The fall in voltage in the mechanical distributor 3 has thus been evaluated at 500 V approximately, which makes it possible to evaluate the ignition overvoltage of the second spark in the spark plug 1 at 400 V approximately in the presence of species which are ionized by the combustion of the air/fuel mixture, and at at least 900–1000 V the overvoltage necessary for ignition of the second spark when there has been prior ignition failure.

Thus, in FIG. 2 are represented the voltages observed at point 9 of the secondary circuit during control of the two sparks, in the case of ignition of the air/fuel mixture during the first spark (graph C) and in the case of ignition failure (graph D), the axis E carrying the time scale. According to the invention, these two situations are distinguished by comparing the initiation voltage of the second spark with a threshold situated a little above the mean initiation voltage $V_2$ in the case of prior ignition (900 V in the experimental implementation described above). In order to do this, the device according to the invention comprises means of detection of the amplitude of the initiation overvoltage of the second spark and means of comparison of this overvoltage with a predetermined threshold. In FIG. 1, it appears that the means of detection comprise a peak voltage measurement circuit 10 equipped with a divider bridge 11 connected to the point 9 of the secondary circuit, with a capacitor 12 connected to the mid-point of this bridge via a protection diode 13, with an MOS transistor 14 for zero resetting of the charge on this capacitor 12 and with an inverter stage 15 for shaping the voltage at the terminals of the capacitor in order to deliver an analog signal representing this voltage to the microprocessor 6.

The microprocessor 6 normally controls earthing of the capacitor 12, by bringing the transistor 14 into conduction, the control signal being derived from the output 16 of the microprocessor.

The microprocessor successively controls the emission of the first and second sparks. On emission of the latter, it also controls temporary blocking of the transistor 14 for a time $T_3$ (see FIG. 2, C) in order to bring about charging of the capacitor 12 to the ignition overvoltage of the second spark. This overvoltage, shaped in stage 15, is compared in the microprocessor with a predetermined threshold. When the overvoltage is greater than the threshold, it is deduced thereby that there has been ignition failure during the first spark.

The microprocessor can be duly programmed in order to perform software programming of successive values of this initiation voltage, sampled during successive operating cycles of the engine. In the case of a multi-cylinder engine, the processing will be carried out cylinder by cylinder. In order to make the device auto-adaptive, in the case of drifts in the measured overvoltages due to deposits of scale or to a variation in the spark plug electrode gap, as well as removal of parasitic signals, the processing can comprise digital filtering, for example first order, of the measured overvoltages. An algorithm for evaluation of a mean overvoltage $V_{mean(i)}$ is then used such that:

$$V_{mean(i)}=V_{mean(i-1)}+k(V_i-V_{mean(i-1)})$$

where $V_i$ is the instantaneous overvoltage measured during the ith engine cycle and k a constant.

If $[V_1-V_{mean(i)}]/V_{mean(i)} \geqq$ predetermined threshold, the microprocessor registers and signals a prior ignition failure. The threshold can be a function of the rotational speed of and of the load on the engine. In this case, the threshold values to be taken into account are picked out by the microprocessor from a digital table placed in memory.

The second spark, obviously, has to occur when ionised gases are present in the cylinder, that is to say well before the escape of these gases. Preferably, the second spark is triggered close to the pressure maximum in the cylinder, resulting from combustion, that is to say in the time interval which elapses until the pressure in the cylinder attains its maximum, close to the top dead center TDC (see FIG. 2, E).

In practice, the time intervals $T_1$ and $T_2$ are such that at:

$$1000\ rpm,\ T_1+T_2=3\ ms$$

$$6000\ rpm,\ T_1+T_2=1.5\ ms$$

$T_2$ being of the order of 0.7 ms approximately. The duration of the main spark is deduced therefrom: 2.3 ms at 1000 rpm, 0.8 ms at 6000 rpm, which is acceptable. The duration $T_2$ of charging of the coil for production of the second spark is determined such that a spark discharge between the electrodes of the spark plug is certain to be obtained, and the duration $T_1$ of the first spark is established in order to ensure correct firing of the air/fuel mixture in the cylinder, as has been seen above. The second spark overvoltage is recorded only during a time $T_3=T_2+200$ μs (for example see FIG. 2, C) controlled by the microprocessor (output 16) in order to avoid taking parasitic pulses into account.

Needless to say, the invention is not limited to the embodiment described and represented which has been given only by way of example. Thus, the coil could also be recharged, for production of the second spark, with energy calculated to permit the production of a spark only in the case of prior ignition of the mixture during emission of the first spark. This method would, however, lack certainty due to the fact that the inter-electrode resistance can fall over time (losses due to a carbon deposit) or increase (increase in the gap between electrodes). Moreover, the invention is clearly applicable to ignition devices other than inductive and capacitive devices, for example, and to "static" ignition devices in which the supply to the spark plugs is controlled by power transistors and not by a mechanical distributor.

We claim:

1. A method of detecting an ignition failure in an internal combustion engine cylinder into which an air/fuel mixture is introduced and a spark is electrically generated for igniting the air/fuel mixture, which comprises:

triggering a first spark in a cylinder for igniting an air/fuel mixture in the cylinder;

subsequently triggering a second spark in the cylinder during a combustion stroke initiated with the first spark;

measuring a breakdown overvoltage of the second spark;

comparing the measured breakdown overvoltage to a predetermined threshold voltage and determining whether the measured breakdown overvoltage is greater or less than the predetermined threshold voltage; and deducing, from a result obtained in the comparing step, whether or not an ignition failure has occurred prior to the second spark.

2. The method according to claim 1, which comprises triggering the first and second sparks successively with the same spark plug.

3. The method according to claim 1, which comprises triggering the second spark before an instant at which a pressure in the cylinder attains a maximum.

4. The method according to claim 1, which comprises performing the triggering, measuring, comparing and deducing steps with regard to one cylinder and subsequently performing the steps at another cylinder of an internal combustion engine with a plurality of cylinders.

5. The method according to claim 4, which comprises sampling a plurality of breakdown overvoltages of the second spark during a plurality of successive engine cycles, calculating a mean current value of the breakdown overvoltage by first-order filtering, and comparing an instantaneously measured overvoltage with the mean value in the comparing step.

6. The method according to claim 11, which comprises determining the threshold voltage as a function of at least one of a rotational speed of the internal combustion engine and a load on the internal combustion engine.

7. The method according to claim 1, which comprises triggering the second spark before a first TDC following the first spark.

8. An apparatus for detecting an ignition failure in an internal combustion engine cylinder into which an air/fuel mixture is introduced and a spark is electrically generated for igniting the air/fuel mixture in the cylinder, comprising:

a) means for triggering a second spark in an ignition spark plug in a cylinder of an internal combustion engine during a combustion stroke directly following a first spark for igniting an air/fuel mixture in the cylinder;

b) means for detecting an amplitude of a breakdown overvoltage of the second spark; and c) means for comparing the breakdown overvoltage with a predetermined threshold voltage.

9. The apparatus according to claim 8, wherein said detecting means include a capacitor connected to a supply circuit for the ignition spark plug and means for preventing charging of said capacitor outside of a predetermined time interval during which the second spark overvoltage must occur.

10. The apparatus according to claim 9, including a microprocessor for controlling a triggering of the first and second sparks and for controlling said preventing means, said comparing means being incorporated in said microprocessor.

11. The apparatus according to claim 10, wherein said microprocessor includes means for sampling a plurality of breakdown overvoltages of the second spark during a plurality of successive engine cycles, and means of digitally filtering the breakdown overvoltage.

12. The apparatus according to claim 8, wherein said microprocessor issues a signal to a fuel supply control of the internal combustion engine for cutting-off a fuel supply to a cylinder in which an ignition failure has been detected.

* * * * *